(12) United States Patent
Ilkanaev et al.

(10) Patent No.: US 8,744,350 B2
(45) Date of Patent: Jun. 3, 2014

(54) ACTIVATING AN APPLICATION

(75) Inventors: Yossef Ilkanaev, Pardes Chana-Karkur (IL); Ehud Spiegel, Petach-Tikva (IL); Yoav Lorch, Herzlia (IL)

(73) Assignee: Zlango Ltd., Tel-Aviv (IL)

( * ) Notice: Subject to any disclaimer, the term of this patent is extended or adjusted under 35 U.S.C. 154(b) by 842 days.

(21) Appl. No.: 12/087,776

(22) PCT Filed: Jan. 16, 2007

(86) PCT No.: PCT/IB2007/050141
§ 371 (c)(1),
(2), (4) Date: Jul. 15, 2008

(87) PCT Pub. No.: WO2007/080557
PCT Pub. Date: Jul. 19, 2007

(65) Prior Publication Data
US 2010/0240350 A1    Sep. 23, 2010

Related U.S. Application Data

(63) Continuation-in-part of application No. PCT/IL2006/000061, filed on Jan. 16, 2006, and a
(Continued)

(30) Foreign Application Priority Data

Jan. 16, 2006 (IL) .................................... 173169

(51) Int. Cl.
*H04B 7/00* (2006.01)
*H04B 1/00* (2006.01)
*H04M 11/00* (2006.01)
*H04W 68/00* (2009.01)
*H04M 1/00* (2006.01)
*H04B 1/38* (2006.01)
*H04W 84/18* (2009.01)
*H04M 1/725* (2006.01)
*H04W 88/06* (2009.01)

(52) U.S. Cl.
CPC ............ *H04W 84/18* (2013.01); *H04M 1/7253* (2013.01); *H04W 88/06* (2013.01)

USPC ............ 455/41.2; 455/69; 455/418; 455/419; 455/458; 455/557; 379/201.01; 370/252

(58) Field of Classification Search
USPC .......... 455/41.2, 69, 418, 419, 458, 557, 572; 379/201.01; 370/252
See application file for complete search history.

(56) References Cited

U.S. PATENT DOCUMENTS 5,319,386 A    6/1994 Gunn et al.
(Continued)

FOREIGN PATENT DOCUMENTS

EP              629947              12/1994
(Continued)

OTHER PUBLICATIONS

Response Dated Feb. 21, 2011 to Official Action of Jan. 19, 2011 From the US Patent and Trademark Office Re. U.S. Appl. No. 11/795,319.
(Continued)

*Primary Examiner* — William D Cumming (57) ABSTRACT

The application discloses a method for establishing a connection between a first communication device capable of receiving an activating message and a mobile communication device, the method comprising:
(a) determining that the mobile communication device is seeking communication with a communication device;
(b) checking the status of a first communication device;
(c) choosing an action required for establishing the connection in view of the status of the first communication device; and
(d) taking the action chosen in (c),
wherein taking the action comprises sending to the first communication device an activating message, having at least a portion which activates an application residing on the first communication device.

15 Claims, 3 Drawing Sheets

US 8,744,350 B2

Page 2

Related U.S. Application Data continuation-in-part of application No. PCT/IL2006/000062, filed on Jan. 16, 2006.

(60) Provisional application No. 60/807,855, filed on Jul. 20, 2006, provisional application No. 60/807,863, filed on Jul. 20, 2006, provisional application No. 60/644,021, filed on Jan. 18, 2005.

(56) References Cited

U.S. PATENT DOCUMENTS

| | | | | |
|---|---|---|---|---|
| 5,367,626 | A | 11/1994 | Morioka et al. | |
| 5,880,731 | A | 3/1999 | Liles et al. | |
| 5,991,807 | A | 11/1999 | Schmidt et al. | |
| 5,999,541 | A | 12/1999 | Hinchey et al. | |
| 6,022,222 | A | 2/2000 | Guinan | |
| 6,044,248 | A | 3/2000 | Mochizuki et al. | |
| 6,121,965 | A | 9/2000 | Kenney et al. | |
| 6,166,734 | A | 12/2000 | Nahi et al. | |
| 6,167,441 | A | 12/2000 | Himmel | |
| 6,370,119 | B1 * | 4/2002 | Basso et al. | 370/252 |
| 6,397,089 | B1 * | 5/2002 | Kabe | 455/572 |
| 6,434,564 | B2 | 8/2002 | Ebert | |
| 6,477,274 | B1 | 11/2002 | Kim et al. | |
| 6,785,730 | B1 | 8/2004 | Taylor | |
| 6,963,762 | B2 | 11/2005 | Kaaresoja et al. | |
| 6,987,991 | B2 | 1/2006 | Nelson | |
| 6,990,452 | B1 | 1/2006 | Ostermann et al. | |
| 6,996,370 | B2 * | 2/2006 | De Loye et al. | 455/41.2 |
| 7,035,803 | B1 | 4/2006 | Ostermann et al. | |
| 7,043,530 | B2 | 5/2006 | Isaacs et al. | |
| 7,081,905 | B1 | 7/2006 | Raghunath | |
| 7,315,613 | B2 | 1/2008 | Kleindienst et al. | |
| 7,412,044 | B2 * | 8/2008 | Chavez et al. | 379/201.01 |
| 7,474,899 | B1 * | 1/2009 | Balasubramaniam | 455/458 |
| 7,503,009 | B2 | 3/2009 | Peters | |
| 7,505,762 | B2 * | 3/2009 | Onyon et al. | 455/419 |
| 7,515,936 | B2 * | 4/2009 | Feller | 455/557 |
| 7,548,849 | B2 | 6/2009 | Fux et al. | |
| 7,565,404 | B2 | 7/2009 | Gwozdz | |
| 7,571,213 | B2 | 8/2009 | Walkush et al. | |
| 7,624,149 | B2 | 11/2009 | Sheppard et al. | |
| 7,647,560 | B2 | 1/2010 | Macauley et al. | |
| 7,669,135 | B2 | 2/2010 | Cunningham et al. | |
| 7,792,981 | B2 | 9/2010 | Taylor | |
| 7,835,729 | B2 | 11/2010 | Hyon | |
| 7,844,228 | B2 * | 11/2010 | Kitakado | 455/69 |
| 2001/0050914 | A1 | 12/2001 | Akahane et al. | |
| 2002/0111177 | A1 | 8/2002 | Castres et al. | |
| 2002/0163538 | A1 | 11/2002 | Shteyn | |
| 2003/0017825 | A1 * | 1/2003 | De Loye et al. | 455/418 |
| 2003/0045355 | A1 | 3/2003 | Comair | |
| 2003/0084121 | A1 | 5/2003 | De Boor et al. | |
| 2005/0071364 | A1 | 3/2005 | Xie et al. | |
| 2005/0096217 | A1 | 5/2005 | Rokicki et al. | |
| 2005/0101338 | A1 | 5/2005 | Kraft | |
| 2005/0116956 | A1 | 6/2005 | Beardow | |
| 2005/0176454 | A1 | 8/2005 | Chakraborty et al. | |
| 2005/0192078 | A1 | 9/2005 | Jawaharlal | |
| 2006/0015560 | A1 | 1/2006 | MacAuley et al. | |
| 2006/0025220 | A1 | 2/2006 | Macauley et al. | |
| 2006/0094453 | A1 | 5/2006 | Rhyu | |
| 2010/0179991 | A1 | 7/2010 | Lorch et al. | |
| 2011/0004694 | A1 | 1/2011 | Taylor | |

FOREIGN PATENT DOCUMENTS

| | | |
|---|---|---|
| EP | 1215867 | 6/2002 |
| WO | WO 2005/081552 | 9/2005 |
| WO | WO 2007/080558 | 7/2007 |
| WO | WO 2007/080559 | 7/2007 |

OTHER PUBLICATIONS

Official Action Dated Apr. 19, 2011 From the US Patent and Trademark Office Re. U.S. Appl. No. 11/795,319.
Offica Action Dated Apr. 7, 2011 From the Israel Patent Office Re. Application No. 40673 and Its Translation Into English.
Office Action Dated Apr. 5, 2011 From the Israel Patent Office Re. Application No. 184644 and Its Translation Into English.
Official Action Dated Apr. 8, 2011 From the US Patent and Trademark Office Re. U.S. Appl. No. 11/795,318.
Official Action Dated May 3, 2011 From the US Patent and Trademark Office Re.: U.S. Appl. No. 12/087,782.
Official Action Dated Jun. 1, 2010 From the US Patent and Trademark Office Re.: U.S. Appl. No. 12/087,783.
Response Dated Jun. 16, 2011 to Official Action of Apr. 19, 2011 From the US Patent and Trademark Office Re. U.S. Appl. No. 11/795,319.
Official Action Dated Jul. 7, 2010 From the US Patent and Trademark Office Re. U.S. Appl. No. 11/795,319.
Official Action Dated Jul. 21, 2010 From the US Patent and Trademark Office Re. U.S. Appl. No. 11/795,318.
Official Action Dated Sep. 2, 2010 From the US Patent and Trademark Office Re.: U.S. Appl. No. 12/087,782.
International Preliminary Report on Patentability Dated Jul. 26, 2007 From the International Bureau of WIPO Re.: Application No. PCT/IL2006/000061.
International Preliminary Report on Patentability Dated Jan. 29, 2009 From the International Bureau of WIPO Re.: Application No. PCT/IB2007/050142.
International Preliminary Report on Patentability Dated Jul. 31, 2008 From the International Bureau of WIPO Re.: Application No. PCT/IB2007/050141.
International Search Report and the Written Opinion Dated Feb. 28, 2008 From the International Searching Authority Re.: Application No. PCT/IL06/00062.
Invitation to Pay Additional Fees Dated Jan. 31, 2007 From the International Searching Authority Re.: Application No. PCT/IL06/00061.
Response Dated Feb. 2, 2011 to Official Action of Sep. 2, 2010 From the US Patent and Trademark Office Re.: U.S. Appl. No. 12/087,782.
Notice of Allowance Dated Apr. 7, 2011 From the US Patent and Trademark Office Re.: U.S. Appl. No. 12/087,783.
Official Action Dated Jan. 19, 2011 From the US Patent and Trademark Office Re. U.S. Appl. No. 11/795,319.
Response Dated Jan. 20, 2011 to Official Action of Jul. 21, 2010 From the US Patent and Trademark Office Re. U.S. Appl. No. 11/795,318.
Notice of Allowance Dated Dec. 2, 2010 From the US Patent and Trademark Office Re.: U.S. Appl. No. 12/087,783.
Response Dated Nov. 1, 2010 to Official Action of Jun. 1, 2010 From the US Patent and Trademark Office Re.: U.S. Appl. No. 12/087,783.
Response Dated Dec. 8, 2010 to Supplementary European Search and European Search Opinion Dated May 21, 2010 From the European Patent Office Re. Application No. 06700648.6.
Response Dated Nov. 8, 2010 to Official Action of Jul. 7, 2010 From the US Patent and Trademark Office Re. U.S. Appl. No. 11/795,319.
Official Action Dated Aug. 17, 2011 From the US Patent and Trademark Office Re. U.S. Appl. No. 11/795,319.
Response Dated Sep. 6, 2011 to Official Action of May 3, 2011 From the US Patent and Trademark Office Re.: U.S. Appl. No. 12/087,782.
Searle "A Brief History of Character Codes", TRON, http://tronweb.super-nova.co.jp/characcodehist.html., 2001.
Taketani et al. "Data Acquisition System With Database at the SPring—8 Storage Ring", 1998.
Response Dated Aug. 8, 2011 to Official Action of Apr. 8, 2011 From the US Patent and Trademark Office Re. U.S. Appl. No. 11/795,318.
Official Action Dated Sep. 27, 2011 From the US Patent and Trademark Office Re.: U.S. Appl. No. 12/087,782.
Official Action Dated Aug. 12, 2011 From the US Patent and Trademark Office Re. U.S. Appl. No. 11/795,318.
Office Action Dated Jul. 18, 2012 From the Israel Patent Office Re. Application No. 166322 and Its Translation Into English.
McCoy "Interface and Language Issues in Intelligent Systems for People With Disabilities", Assistive Technology and Artificial Intelligence: Applications in Robotics, User Interfaces and Natural Language Processing, Lecture Notes in AI Series, 1458: 1011, 1998.

(56) References Cited

OTHER PUBLICATIONS

Office Action Dated Jul. 23, 2012 From the Israel Patent Office Re. Application No. 173169 and Its Translation Into English.

Office Action Dated Apr. 7, 2011 From the Israel Patent Office Re. Application No. 40673 and Its Translation Into English.

Official Action Dated Apr. 25, 2012 From the US Patent and Trademark Office Re.: U.S. Appl. No. 12/087,782.

Official Action Dated Apr. 26, 2012 From the US Patent and Trademark Office Re. U.S. Appl. No. 11/795,318.

Advisory Action Before the Filing of an Appeal Brief Dated Aug. 27, 2012 From the US Patent and Trademark Office Re. U.S. Appl. No. 11/795,318.

Notice of Allowance Dated Oct. 5, 2012 From the US Patent and Trademark Office Re. U.S. Appl. No. 11/795,318.

Official Action Dated Oct. 5, 2012 From the US Patent and Trademark Office Re. U.S. Appl. No. 12/087,782.

Supplementary European Search and European Search Opinion Dated May 21, 2010 From the European Patent Office Re. Application No. 06700648.6.

\* cited by examiner

ACTIVATING AN APPLICATION

RELATED APPLICATIONS

This application is a National Phase of PCT Patent Application No. PCT/IB2007/050141 having International Filing Date of Jan. 16, 2007 which is a continuation-in-part of PCT Patent Application No. PCT/IL2006/000061, filed on Jan. 16, 2006, which claims the benefit under 35 U.S.C. §119(e) of U.S. Provisional Patent Application No. 60/644,021, filed on Jan. 18, 2005. PCT/IB2007/050141 is also a continuation-in-part of PCT Patent Application No. PCT/IL2006/000062, filed on Jan. 16, 2006.

PCT/IB2007/050141 also claims the benefit under 35 U.S.C. §119(e) of the following US Provisional Patent Applications: 60/807,855, filed on Jul. 20, 2006 ; and 60/807,863, filed on Jul. 20, 2006.

PCT/IB2007/050141 is related to Israel Patent Application No. 166322, filed on Jan. 16, 2005, and Israel Patent Application No. 173169, filed on Jan. 16, 2006.

This application is also related to PCT Patent Application Nos. PCT/IB2007/050143, filed on Jan. 16, 2007 and PCT/IB2007/050142, filed on Jan. 16, 2007.

The disclosures of the above applications are incorporated herein by reference.

FIELD OF THE INVENTION

This application relates to methods for establishing a connection between communication devices and to methods for activating non-active programs residing on a communication device.

BACKGROUND OF THE INVENTION

U.S. Pat. No. 7,113,803 assigned to MICROSOFT Corporation, the disclosure of which is incorporated herein by reference, describes a method and system for enabling instant messaging on mobile devices, according to which a customized SMS message is sent to awaken the mobile device so that instant messaging may be initiated. In one of the described embodiments, the recipient responds to the customized SMS message by creating an Internet connection and establishing a chat session over the Internet connection.

The customized SMS is generated and sent by the server, which translates a regular SMS it receives. The patent does not appear to describe any status check made by the server.

SUMMARY OF THE INVENTION

An aspect of some embodiments of the invention relates to enabling a communication device (hereinafter sender) to launch a communication session with another communication device (hereinafter recipient), where launching the session requires a change in the behavior of an application residing on the recipient. Optionally, the application is a communication application. In an exemplary embodiment of the invention, the sender is a mobile device, and optionally the recipient is also mobile. Optionally, a mobile device is a cellular device, for instance, a cellular phone.

A change in behavior of an application may be required, for example, when an IP connection has to be established, and the recipient is off-line or idle. If the device is off-line, change of a behavior of an IP-connecting application (from non-active to active) is typically required. If the recipient is idle, for instance, connected to the internet but not polling the server, there is a need to change a behavior of the polling application to poll the server earlier than set by the recipient's polling schedule. Another example of an activating message is an invocation message, which, for example awakens a sleeping communication program. A program is considered sleeping if it has a main application and a listening application, and the listening application activates the main application upon detecting appropriate events.

Optionally, the activating message activates an email client to poll messages from the email server, and the email message has a link for opening by the recipient. Opening of the link establishes the IP connection between the sender and the recipient.

In exemplary embodiments of the invention, changing the behavior is achieved with the aid of an activating message, which is a message having at least a portion (hereinafter an activating portion) configured to be interpreted by a recipient as a command for changing a behavior of an application residing on the recipient. Optionally, the activating message is sent via SMS and/or MMS. Optionally, the activating message is sent by other communication means, such as BLUETOOTH, WiFy, WIMAX, etc. Optionally, the activating message is a cellular specific message, namely, a message that cellular phones are configured for receiving commands on. Optionally, the activating message is sent over a cellular network, such as GSM, CDMA, or the like.

An aspect of some embodiments of the invention relates to a server choosing for its client an appropriate connection path in response to a connection request presented by the client, referred herein as the sender. Choosing may improve the suitability of the connection path for connecting the specific sender with the specific recipient. Additionally or alternatively, choosing may comprise finding an appropriate recipient, suitable for requirements set up by the sender.

In an embodiment of the invention, in response to a connection request from a sender, the server runs a status check for checking the status of the recipient, and decides on the action to be taken, taking into consideration the status of the recipient. For instance, a recipient that does not have an application that is required for establishing a connection with the sender may be sent a message offering download of a suitable application. Optionally, it is the sender that takes the action of the action item. In an embodiment of the invention, the server sends the sender the result of the status check, and the recipient decides on the next action item.

In exemplary embodiments of the invention, the actions taken by the devices for establishing a connection between them are transparent to the users of the devices in the sense that other than requesting the connection by one of the users, the users are not required to any further action for establishing the connection between their devices. Alternatively or additionally, actions taken by the devices do require input from the users, for instance, when a user is requested to download an application or to manually activate a program.

A feature of some embodiments of the invention is that the number of expansive communication transmissions is reduced, for instance, information is sent over IP instead of over SMS.

A feature of some embodiments of the invention is that the communicating users, and in some embodiments only the user initiating the communication, create the expansive transmissions. For instance, that SMSs are sent from users under the control of the user, and not by the server and not by the user device without the user knowing about the expansive transmission being made on its account.

There is thus provided by an exemplary embodiment of the invention a method for establishing a connection between a first communication device capable of receiving an activating message and a mobile communication device, the method comprising:

(a) determining that the mobile communication device is seeking communication with a communication device;
(b) checking the status of a first communication device;
(c) choosing an action required for establishing the connection in view of the status of the first communication device; and
(d) taking the action chosen in (c), wherein taking the action comprises sending to the first communication device an activating message, having at least a portion which activates an application residing on the first communication device.

In exemplary embodiments of the invention, the chosen action comprises opening an IP connection.

Optionally, the first communication device is mobile.

Optionally, the activating message is sent over a cellular network.

Optionally, the activating message is a cellular specific message, for instance, SMS.

In exemplary embodiments of the invention, receiving a request to communicate with a first communication device from a mobile communication device comprises uploading a server with a first message addressed to the recipient, and wherein activating an application residing on the first communication device comprising causing the first communication device to download the first message.

Optionally, sending to the first communication device an activating message comprises sending a message to the mobile communication device, the message indicating to the mobile communication device that sending an activating SMS to the first communication device is desirable.

Optionally, upon receipt of the message, the mobile device generates the activating message and sends it.

Optionally sending to the first communication device an activating message comprises sending an activating message from a server to the first communication device.

There is also provided in accordance with an exemplary embodiment of the invention a method for activating a non-active application residing on a first communication device configured to receive activating messages, the method comprising:

(a) operating an application residing on a mobile communication device to generate an activating message;
(b) sending the activating message from the mobile communication device to the first communication device;
(c) receiving the activating message by the first communication device; and
(d) responding to the activating message, wherein responding comprises activating the non-active application and opening an IP connection.

In exemplary embodiments of the invention, the IP connection is between the first communication device and the mobile communication device.

Optionally, the first communication device is mobile.

Optionally, the activating message is sent over a cellular network.

Optionally, the activating message is a cellular specific message.

Optionally, the activating message is an SMS.

In exemplary embodiments of the invention, the IP connection between the first communication device and the mobile communication device is by uploading at least one message to a server by the mobile communication device and downloading the at least one message from a server by the first communication device.

Optionally, the non-active application comprises a messaging enabling application.

Optionally, the messaging enabling application is an instant messaging application.

Optionally, the first communication device comprises a mobile device.

Optionally, a mobile device comprises a cellular phone.

Optionally, activating an application residing on the first communication device comprises requesting permission from a user of the first communication device to activate.

Optionally, a method according to the invention requires from the user of the first communication device only to express consent to communicate with the mobile device.

BRIEF DESCRIPTION OF THE DRAWINGS

Some embodiments of the invention are described below in detail to exemplify how the invention may be carried out in practice. The detailed description below relates to the drawings, in which.

DETAILED DESCRIPTION OF EXEMPLARY EMBODIMENTS

Overview

Figure 1:
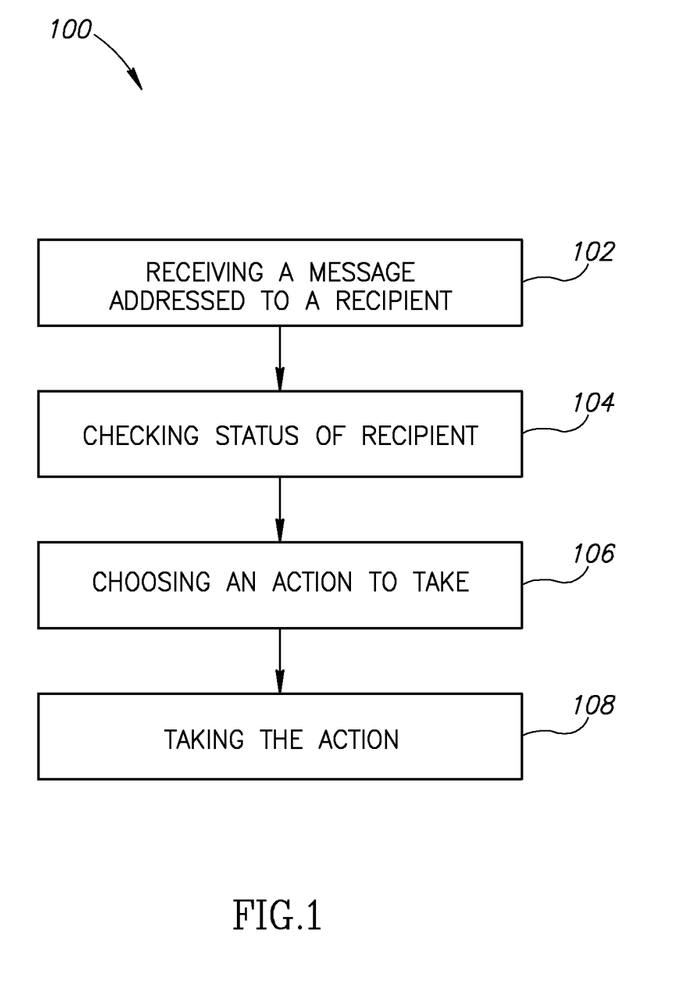
FIG. 1 is a flow-chart describing actions taken in establishing communication with an activating SMS according to an embodiment of the invention.
Figure 2:
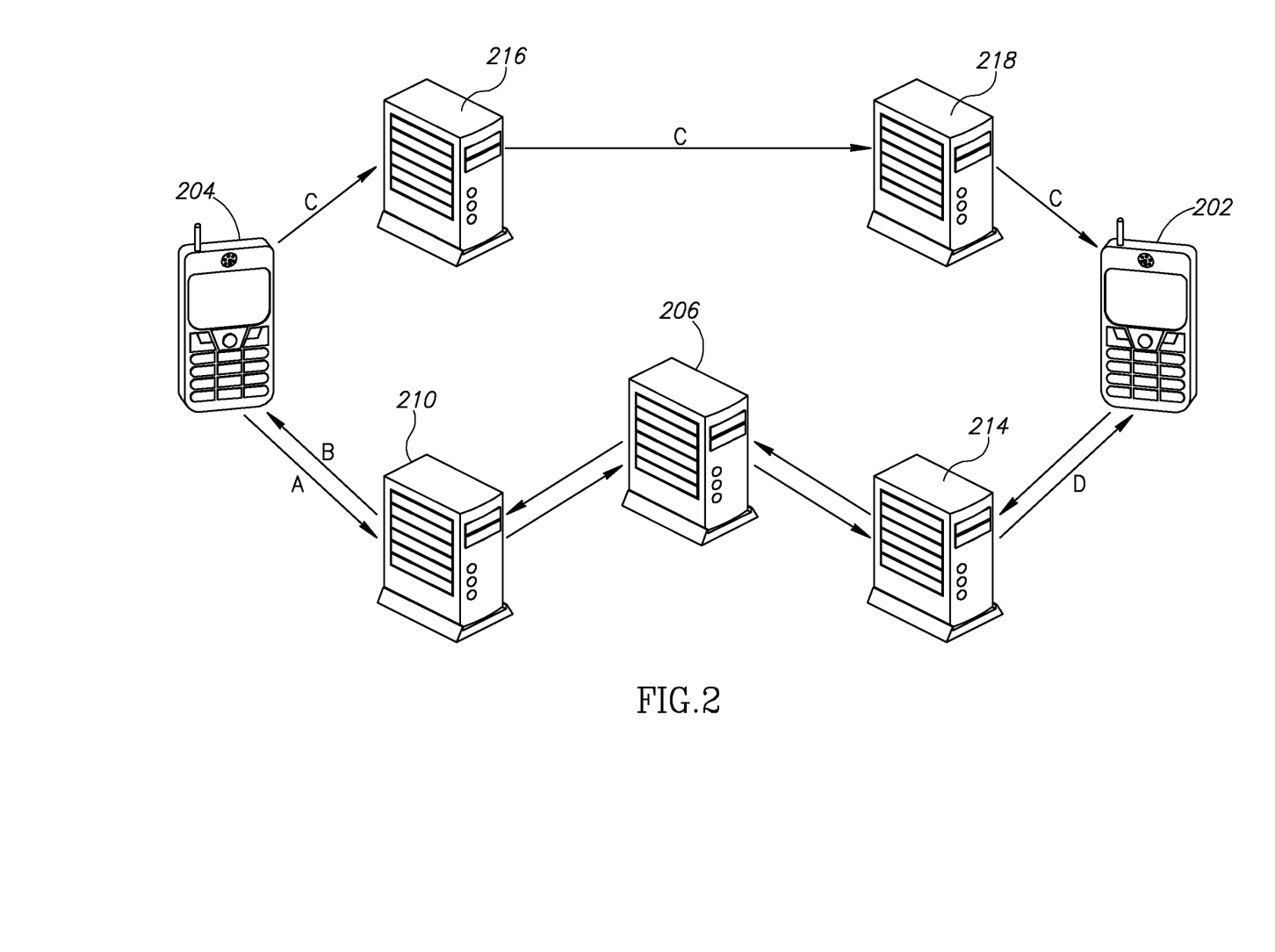
FIG. 2 is a pictorial presentation of sender, recipient, and communication means that may be used to connect between them according to an embodiment of the invention.

FIG. 1 is a flow-chart showing actions taken in a method (100) for establishing a connection according to an embodiment of the invention. FIG. 2 is an illustration of a network allowing execution of the method described in FIG. 1 according to an embodiment of the invention.

The connection is to be created between a first communication device (202) and a mobile communication device 204. The first communication device (202) is optionally configured for receiving an activating SMS, interpreting it, and instructing other applications residing on the recipient (202) to behave as instructed by the activating SMS. Examples of mobile communication devices suitably configured are cellular phones working in GSM networks and supporting J2ME applications, or cellular phones working in CDMA networks and supporting BREW applications.

Method 100 includes receiving (102) by server 206 a message uploaded by mobile communication device 204 addressed to recipient 202. In response to receiving the message, server 206 checks (104) the server's records to determine the status of mobile device 204 and chooses (106), in accordance with this status, an action required for establishing the connection. Examples of actions and considerations for choosing an action are presented below.

After the action is decided, the action is taken (108), establishing a connection. Optionally, the action is taken by server 206 itself. Alternatively, the server sends the action item to sender 204, which carries it out.

In an exemplary embodiment of the invention, taking the action includes sending to recipient 202 an activating SMS, which activates an application residing on the recipient.

Exemplary Uses

In an embodiment of the invention, methods of the invention are used for establishing an instant messaging session between sender 204 and receiver 202. The actions taken in this embodiment are indicated in FIG. 2 as arrows referenced by letters. In an exemplary embodiment, user of sender 204 sends an IM invitation to the recipient using a user interface of sender device 204. Inviting recipient 202 to the IM session is carried out by sender device 204 uploading (A) a message to server 206 over HTTP or other protocol, such as SIP (optionally through an IP gateway, generally presented as gateway 210). In response to this message, optionally in the response phase of the HTTP session, sender 204 receives (B) from server 206 an action item, defining the next step to be taken. Optionally, the action item is in the form of a suggestion, to be followed or rejected by the sender device. Optionally, the action item is in a form of status only, and this status is considered by the sender device in deciding on the next action. Optionally, the action item includes an SMS generated by the server and ready for sending by the sender. If the server found that recipient 202 has not polled for more than some predetermined period, the action item is optionally sending an activating SMS to the recipient. Sender 204 sends (C) an activating SMS to recipient 202 (for instance, through SMS centers 216, 218), and in response, the recipient opens an IP connection, optionally through IP gateway 112, to communicate with sender 204. Optionally, communication between sender 204 and recipient 202 is by uploading and downloading messages, in which case, after the IP connection of recipient 202 is opened, the recipient polls server 206. Upon receiving (D) the message uploaded in (A), the sender recipient can reply to the sender via IP connection, optionally via IP gateway 214, and no further SMS is required. When sender 204 uploads its reply to the server, the server checks the status of the recipient, and this time it finds that recipient 202 is active, and therefore would send a "do nothing" action item, as no further action is required for continuing the IM session.

Another method for establishing connections according to an embodiment of the invention starts when a user of sender 204 indicates to the sender device its wish to play poker. Sender device 204 has on it an application, knowing that poker is played by the user with at least three other devices.

Optionally, sender 204 sends server 206 a message indicating the wish to play poker, and server 206 records this wish, and sends back a list of other devices that in accordance with the server's records are available and wish to play poker.

Alternatively, possible poker players, with which the user of the sender likes playing poker, are listed in a 'poker list'. Optionally, the list includes preference, indicating with which member the user of the sender prefers playing.

Sender 204 requests from server 206 status of the members of the poker list. Server 206 runs a status check on each, and informs sender 204 of the statuses. If less than three of the list members are available (either active or may be activated), sender 204 indicates to its user that not enough members are available, and the method ends.

If there are three or more available list members, sender 204 uploads messages with poker invitations to the three most preferred members of the list, and server 206 establishes a connection with them as described in respect of method 100. In the framework of the present method, status check 104 of method 100 may be skipped, as the status has already been checked.

Optionally, sender 204 reports to server 206 if each communication has or has not been established in fact. This may be used by server 206 to run statistics on communication successes and failures. Optionally, if attempts to establish communication with one or more of the list members have failed, the server tries establishing communication with the one or more list member using another action item.

Optionally, if an attempt to establish communication with one or more of the list members has failed, sender device 204 uploads an invitation for the next member in the list.

Server's Records

In some embodiments of the invention, the server has a record of each possible recipient, and the times it communicated lately with the server. Optionally, if a recipient communicated lately with the server within some predetermined period (say, 30 seconds), the recipient is considered active. Optionally, if the last time a recipient communicated with the server was before some longer predetermined period (say an hour), the recipient is optionally considered off-line. Optionally, if the recipient communicates with the server on a regular basis at long intervals (say, once every 10 minutes), it is considered idle.

In some embodiments of the invention, the server has a record of devices that have a certain application residing thereon. Optionally, these include devices that downloaded the application from the server. Additionally or alternatively, these include devices that downloaded the application from another server allowing downloading the application. Additionally or alternatively, the application supplier provides the server with a list of the devices, on which the application was installed. Optionally, as part of the installation process of the application on a device, the device is recorded with the server.

In some embodiments of the invention, the server is supplied with information on the cellular activity of a device by the cellular operator. Optionally, the operator may inform the server that at a particular moment a device is busy, on a 'do not disturb' state, or the like.

In some embodiments of the invention, devices send their status to the server, for instance, a device may send a server a status announcement, according to which it is available for receiving communications only from a certain device, a list of devices or devices of particular characteristics.

Exemplary Possible Actions and Exemplary Considerations for Choosing Among them

In some embodiments of the invention, the server decides on an action to be taken responsive to the status of the recipient. Following are some options for action items, among which the server may choose, and recipient statuses, in which a server may choose each of them.

1. Sending an activating message to activate a non-active application. This action item is optionally issued by the server if the server determined from its records that the application is not active. If the application is indeed not active, and is configured to being activated by an activating message, it is activated.

In some cases, the activating portion of the message is useless. For instance, in case the application is already active, the activating portion of the message is unnecessary and ineffective. Similarly, in case the recipient does not have installed the application to be activated by the activating portion of the message, this portion is ineffective.

Optionally, once the server finds from its records that the application is activated, the server sends to the sender a confirmation notice that the recipient's application is now active.

Optionally, the activating message has also a content, non-activating, portion. This may result in that the recipient, upon receiving the message, will be able to read the content of the non-activating portion without any further action to be taken by it or by the sender. In such a case, if for any reason the application was not activated by the activating portion of the message, the receiving user may still know of the message and its content, and reply to the sender.

2. Sending a regular SMS (that is, an SMS not having an activating portion), requesting the user to open the application. This action item may be chosen, for instance, if the recipient is not configured for receiving activating messages, or if the appropriate message cannot be sent for any reason.

3. Sending a regular SMS, suggesting the user to download the application. This action item may be chosen, for instance, if the recipient does not have the appropriate application.

4. Doing nothing. This action item may be chosen, for instance, if the recipient's application is already active and polls periodically, so it does not require activation.

Another example of a situation where a "doing nothing" action may be chosen, is when the recipient is not active on any communication network, so there is no open route for communicating with it at the moment.

Optionally, the action item is accompanied with an explanation as to why it was chosen.

"Doing nothing" action item optionally saves the costs of sending an SMS at the expense of creating IP connection, and this saving may be credited to the sender or to the server operator, as the business model may be.

Exemplary Options for Sending an Activating SMS

In some embodiments of the invention, an activating SMS is sent (for instance, in case the option described above under item 1 is chosen).

Sending the activating SMS may be carried out in several ways, all in accordance with embodiments of the invention.

Optionally, sending the activating SMS includes sending by server 206 an activating SMS to recipient 202. This option may be chosen or rejected by the server, based, for instance on commercial relations between the operator of the server 206, and the recipient and sender. For instance, if the operator of server 206 can charge sender 204 or recipient 202 for sending the SMS, the server may choose sending the activating SMS directly to the recipient; while if such charging is impossible, server 206 may choose indicating to the sender that sending an activating SMS is desirable.

Optionally, upon receipt of a message that sending an activating SMS is desirable, for instance, in the response phase of an HTTP session. Optionally, sender 204 generates an activating SMS and sends it to the recipient. Alternatively, server 206 generates the activating SMS, sends it to the sender, and the sender sends it to the recipient.

Alternatively or additionally, the sender uploads a message to server 206, and sends an activating SMS to recipient 202. The activating SMS activates the recipient to poll a server immediately. Optionally the recipient polls server 206. In this context, a device is activated to poll immediately if it is activated to poll earlier than it had if it wasn't activated.

Figure 3:
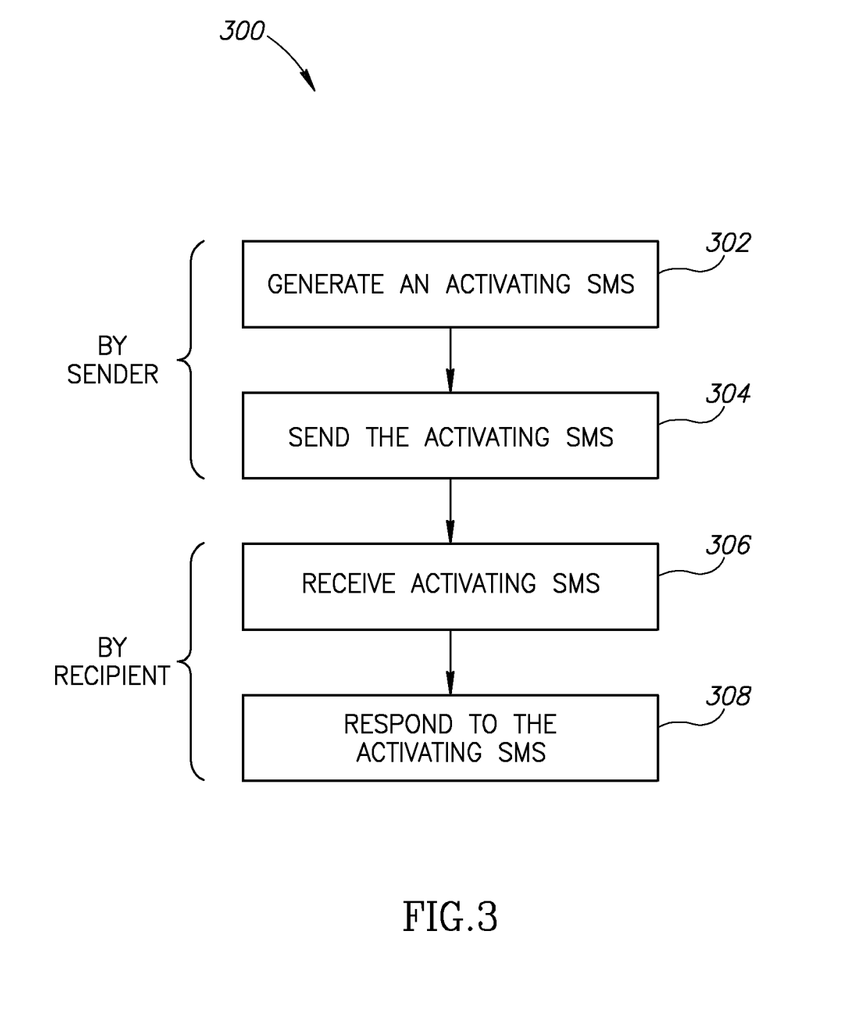
FIG. 3 is a flow-chart describing actions taken by a server in choosing an appropriate action for establishing a connection according to an embodiment of the invention.

FIG. 3 is a flow-chart describing actions taken during carrying out a method 300 for activating a non-active application residing on the recipient device (202).

The non-active application is optionally a messaging application, such as SMS Conversation, IM, Chat, Unified Messaging, and Groups Messaging, a gaming application, or any other application allowing two users to communicate back and forth.

Method 300 includes: operating (302) an application, such as a J2ME application, residing on the sender to generate an activating SMS; sending (304) the activating SMS from the sender to the recipient; receiving (306) the activating SMS by the recipient, and responding (308) to the activating SMS. Optionally, responding comprises activating the non-active application. Optionally, the response includes sending a reply to the sender. In an embodiment of the invention the server generates the activating SMS, sends it to the sender, and the sender sends the SMS to the recipient.

In an exemplary embodiment, responding includes opening an IP connection, for instance, between the sender and the recipient. IP connection between the receiver and the recipient may be direct (for instance, when the two devices are IP enabled), through a server, or through a plurality of servers. For instance, if the sender and the recipient are two mobile devices operated by two different operators, the IP connection may be through two servers, one of each operator.

Optionally, server 206 is an IP server. Alternatively, server 206 is a cellular server.

General

It is to be understood that the invention is not necessarily limited in its application to the particular details set forth in the description contained herein or illustrated in the drawings. The invention is capable of other embodiments and of being practiced and carried out in various ways. Hence, it is to be understood that the phraseology and terminology employed herein are for the purpose of description and should not be regarded as necessarily limiting.

It will also be understood that the invention further contemplates a machine-readable memory and/or circuitry and/or firmware tangibly embodying a program of instructions executable by a machine for executing methods of the invention. Also contemplated is a suitably programmed general purpose machine.

Those skilled in the art will readily appreciate that various modifications and changes can be applied to the embodiments of the invention as hereinbefore described without departing from its scope, defined in and by the appended claims.

In the above detailed description, numerous specific details are set forth in order to provide a thorough understanding of the invention. However, it will be understood by those skilled in the art that the present invention may be practiced without these specific details. In other instances, well-known methods, procedures, components and circuits have not necessarily been described in detail so as not to obscure the present invention.

Unless specifically stated otherwise, as apparent from the above description, it is appreciated that throughout the specification discussions utilizing terms such as, "processing", "computing", "calculating", "determining", or the like, refer to the action and/or processes of a computer or computing system, or processor or similar electronic computing device, that manipulate and/or transform data represented as physical, such as electronic, quantities within the computing system's registers and/or memories into other data, similarly represented as physical quantities within the computing system's memories, registers or other such information storage, transmission or display devices. In some cases, such actions may be carried by a user, for example, deciding on an icon to insert.

The term 'mobile device' used in this patent specification should be expansively construed to cover any kind of mobile device with communications capabilities and includes cellular phones, two-way pagers, radio telephones, PDA, DECT, and wireless information devices. The term includes devices able to communicate using mobile radio such as GSM or UMTS and any other wireless communications standard, system and/or protocol, e.g. BLUETOOTH and WiFi. According to some embodiments of the present invention, the mobile device may communicate with another mobile device or with other devices (e.g. personal computers) via various networks such as, e.g. cellular networks, broadband networks, fixed line networks, data communication networks (such as LAN and WAN) and Internet networks, and/or within various services (e.g. messaging services like SMS, MMS, instant messaging, IMS and others, mobile advertising and mobile-content service).

Embodiments of the present invention may use terms such as, processor, computer, apparatus, system, sub-system, module, unit, device (in single or plural form) for performing the operations herein. This may be specially constructed for the desired purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

Where a single device is described, multiple devices may be provided. For example, a server can comprise multiple servers at a same or distributed locations, and operated by a same or different operators. Conversely, multiple components may be combined into a single component.

The processes/devices (or counterpart terms specified above) and displays presented herein are not necessarily inherently related to any particular computer or other apparatus.

Various general purpose systems may be used with programs in accordance with the teachings herein, or it may prove convenient to construct a more specialized apparatus to perform the desired method. In addition, embodiments of the present invention are not described with reference to any particular programming language. It will be appreciated that a variety of programming languages may be used to implement the teachings of the inventions as described herein. Currently, particular languages are used for cellular telephones, but this should not be considered an essential limitation for all embodiments.

Where software is described as including components, it should be noted that components can be combined and/or implemented in various ways and single components may be broken apart, without leaving the spirit of some embodiments of the invention.

It should be understood that features and/or steps described with respect to one embodiment may be used with other embodiments and that not all embodiments of the invention have all of the features and/or steps shown in a particular figure or described with respect to one of the embodiments. Section heads are provided for ease of navigation and do not necessarily limit the disclosure therein to the subject of the section title.

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. A method for establishing a connection between a first communication device which receives an activating message and a mobile communication device, the method comprising:
   (a) determining that the mobile communication device is seeking communication with the first communication device;
   (b) checking the status of the first communication device;
   (c) choosing an action required for establishing the connection in view of the status of the first communication device; and
   (d) taking the action chosen in (c), wherein taking the action comprises sending an internet protocol (IP) activating message when the status is indicative that the first communication device is in an active state and sending a Short Message Service (SMS) activating message when the status is indicative that the first communication device is in a non active state;
   wherein each one of the IP activating message and the SMS activating message activates an application residing on the first communication device.

2. A method according to claim 1, wherein said first communication device opens an IP connection upon receiving said SMS activating message and changes its state to an active state.

3. A method according to claim 2, wherein the first communication device is mobile.

4. A method according to claim 1, wherein the SMS activating message is a cellular specific message.

5. A method according to claim 1, wherein receiving a request to communicate with the first communication device from the mobile communication device comprises uploading a server with a message addressed to the first communication device, and wherein activating an application residing on the first communication device comprises causing the first communication device to download the message.

6. A method according to claim 1, wherein said taking the action comprises sending a message to the mobile communication device, the message indicating to the mobile communication device that sending at least one of the IP activating message and the SMS activating message to the first communication device is desirable.

7. A method according to claim 6, wherein upon receipt of the message, a mobile device user decides according to said first communication device status to send at least one of the IP activating message and the SMS activating message.

8. A method according to claim 1, wherein said taking the action comprises sending at least one of the IP activating message and SMS activating message from a server to the first communication device.

9. A method according to claim 1, wherein said connection path is selected based on commercial relations between a server operator, and the recipient and the sender.

10. A method according to claim 1, wherein said connection path is selected by a server.

11. A method according to claim 1, wherein said connection path is selected based on said status of said first communication device.

12. A method according to claim 1, wherein said taking the action includes finding a particular first communication device, the particular first communication device selected from a plurality of communication devices.

13. A method according to claim 1, wherein said checking and selecting comprising checking if said first communication device appears in a list stored in a server memory and lists devices which installed said application.

14. A method according to claim 1, wherein said established connection is used for conducting an instant messaging (IM) session between said mobile communication device and said first communication device and said mobile communication device establishes said IM session with a plurality of communication devices.

15. The method according to claim 14, wherein said IM session enables playing multi user games using a plurality of mobile communication devices; wherein said multi user game is a poker game.

* * * * *